3,425,817
LOW MELTING POINT DEVITRIFIED GLASS AND METHOD

Koichi Ikeda and Katsuji Minagawa, Tokyo, Japan, assignors to Nippon Electric Company Limited, Tokyo, Japan, a corporation of Japan
Filed Sept. 13, 1965, Ser. No. 486,643
Claims priority, application Japan, Sept. 16, 1964, 39/52,906
U.S. Cl. 65—33      2 Claims
Int. Cl. C03b *31/00;* C03c *3/22*

This invention relates to a low melting point devitrified glass and to a manufacturing method for the same.

As is well known, it is necessary to make the expansion coefficients of glass and metal match approximately, in order to provide a seal between the glass and metal which will withstand reasonable temperature variations. Since the expansion coefficient of sealing metal is generally smaller than $120 \times 10^{-7}$ and that of glass which can be sealed at a low temperature is in most cases larger than $120 \times 10^{-7}$, satisfactory seals are difficult to obtain. Although several types of glass having a low melting point and an expansion coefficient smaller than $120 \times 10^{-7}$ do exist, these cannot be used for the sealing of electronic components, either because of their electrical conductivity or their instability. In order to overcome such disadvantage, the conventional methods employ materials with small expansion coefficients, such as fused quartz, lithia ceramic, and the like which are added to a stable low melting point glass. By such methods, a low melting point material is produced which does have an expansion coefficient smaller than $120 \times 10^{-7}$, however, other disadvantages then result. Among these are high cost due to expensive processing, lack of uniformity due to mechanical mixing, and the effect of the size of the mixed material on the expansion coefficient.

Accordingly, it is an object of this invention to provide an improved glass for use in glass to metal seals which obviates the above disadvantages, and to provide a manufacturing method therefor.

Figure 1:
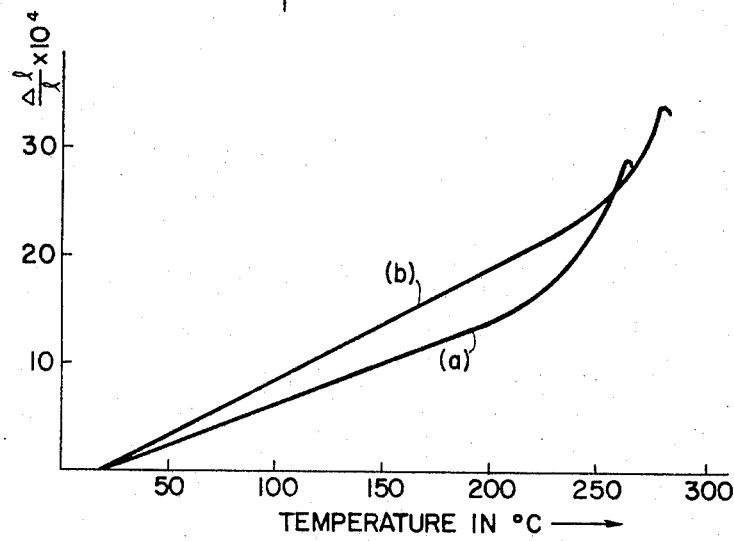
Figure 2:
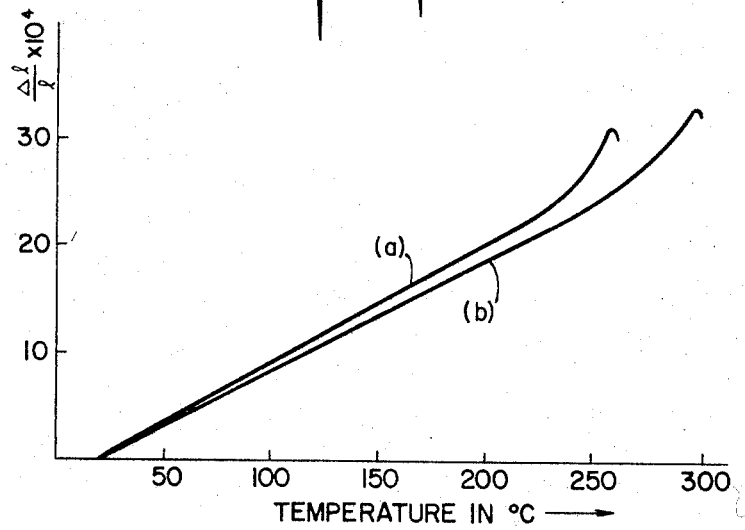

All of the objects, features and advantages of this invention and the manner of attaining them will become more apparent and the invention itself will be best understood by reference to the following description of an embodiment of the invention taken in conjunction with the accompanying drawing, in which:

FIG. 1 shows an expansion characteristic curve of glass made in accordance with one embodiment of the invention, and FIG. 2 shows an expansion characteristic curve of glass made according to another embodiment of the invention.

The present invention provides a devitrified glass and manufacturing method therefor, said glass having a low melting point and a relatively small expansion coefficient. The glass preferably comprises a $PbO-B_2O_3-Tl_2O_3$ system low melting point glass component, $Li_2O-Al_2O_3-SiO_2$ system ceramic component, and a material selected from the group including Au, AgO, and $ZrO_2$, or other material, the material from said latter group being a nuclei forming agent, and the entire mix being melted and heat-treated. More specifically, there is provided a glass having a low melting point and a relatively small expansion coefficient by heat-treating the selected ingredients in order to precipitate within the glass, fine crystals having a smaller expansion coefficient than the glass per se. Examples of such a material are beta eucryptite with a chemical composition of $Li_2O-Al_2O_3-2SiO_2$, beta spodumene with a chemical composition of $Li_2O-Al_2O_3-4SiO_2$, and lithium meta-silicate with a chemical composition of $Li_2O-SiO_2$.

There are a number of conventional methods for devitrifying glass in order to change its characteristics. One of the objects of the devitrification is to increase the softening point of the glass, thereby improving its thermal stability by devitrifying the majority of glass components to increase their mechanical strength by micro-crystallization. Other objects of devitrification are to reduce the expansion coefficient of glass, and to improve the resistance to thermal shock by causing crystals having a low expansion coefficient to precipitate in the glass.

The present invention differs from that of conventional devitrification by, inter alia, lowering the softening point of the glass. Similar effects may also be produced by using compositions other than those described as specific embodiments of the invention. The low melting point glass component of the $PbO-B_2O_3-Tl_2O_3$ system and the ceramic component of the $Li_2O-Al_2O_3-SiO_2$ system may be mixed and melted either as raw materials or as glass and ceramic.

The invention will now be described with reference to specific embodiments in order to illustrate the aforementioned characteristics and objects of the invention.

Embodiment 1.—This embodiment comprises devitrified glass having Ag as nuclei.

The following materials are used, with the composition component percentages being indicated by weight in this and in the subsequent embodiments described:

|  | Percent |
|---|---|
| Red lead, $Pb_3O_4$ | 46 |
| Boric acid, $H_3BO_3$ | 11 |
| Thallium oxide, $Tl_2O_3$ | 27 |
| Silica powder, $SiO_2$ | 7 |
| Aluminum hydroxide, $Al(OH)_3$ | 2 |
| Lithium carbonate, $Li_2CO_3$ | 2 |
| Silver nitrate, $AgNO_3$ | 2 |

These materials are mixed well and placed in an alumina crucible. After obtaining a transparent glass by melting the ingredients at approximately 600° C. or above, the glass is heated again to approximately 600° C. from room temperature at a rate of about 2° C./min. and then cooled. This results in the precipitation of fine crystals comprising three components $Li_2O$, $Al_2O_3$ and $SiO_2$, having a low expansion coefficient. The resulting expansion characteristic is as shown by the curve (a) in FIG. 1. The curve (b) in FIG. 1 shows the expansion characteristic of the transparent glass prior to devitrification. As is clear from FIG. 1 the yield point is lowered by devitrification. In the glass produced in accordance with this embodiment, the composition of the $PbO-B_2O_3-Tl_2O_3$ system and the $Li_2O-Al_2O_3-SiO_2$ system is 86% and 14% by weight, respectively.

Embodiment 2.—Devitrified glass have Ag as a nuclei.

In this embodiment the following composition of materials is employed:

|  | Percent |
|---|---|
| Red lead, $Pb_3O_4$ | 46 |
| Boric acid, $H_3BO_3$ | 11 |
| Thallium oxide, $Tl_2O_3$ | 27 |
| Silica powder, $SiO_2$ | 4.5 |
| Aluminum hydroxide, $Al(OH)_3$ | 6.5 |
| Lithium carbonate, $Li_2CO_3$ | 2 |
| Silver nitrate, $AgNO_3$ | 3 |

These materials are mixed well and placed in an alumina crucible. After obtaining a transparent glass by melting the ingredients at approximately 600° C. or above, the glass is again heated to approximately 600° C. from room temperature at a rate of about 2° C./min., and then cooled. This results in the precipitation of fine crystals compirsing three components, viz. $Li_2O$, $Al_2O_3$, and $SiO_2$, having a low expansion coefficient. The resulting expansion coefficients and yield points of the transparent glass and the devitrified glass are as follows:

| | Expansion coefficient (30–160° C.) | Yield point (° C.) |
|---|---|---|
| Transparent glass | $113.3 \times 10^{-7}$ | 285 |
| Devitrified glass | $110.3 \times 10^{-7}$ | 255 |

As will be seen from this embodiment, the yield point of the glass in accordance with the present invention decreases after devitrification, while in the conventional glass it does not. In the above glass the composition of the $PbO$-$B_2O_3$-$Tl_2O_3$ system and the $Li_2O$-$Al_2O_3$-$SiO_2$ system is 88% and 12% by weight, respectively.

Embodiment 3.—Devitrified glass having Ag as nuclei.

In this embodiment, the following composition of materials is employed:

| | Percent |
|---|---|
| Red lead, $Pb_3O_4$ | 45 |
| Boric acid, $H_3BO_3$ | 10.5 |
| Thallium oxide, $Tl_2O_3$ | 26.5 |
| Silica powder, $SiO_2$ | 5 |
| Aluminium hydroxide, $Al(OH)_3$ | 7 |
| Lithium carbonate, $Li_2CO_3$ | 3 |
| Silver nitrate, $AgNO_3$ | 3 |

These materials are mixed well and placed in an alumina crucible. After obtaining a transparent glass by melting the ingredients at approximately 600° C. or above, the glass is again heated to approximately 600° C. from room temperature at a rate of about 2° C./min. and then cooled. This results in the precipitation of fine crystals comprising three components, viz. $Li_2O$, $Al_2O_3$, and $SiO_2$, having a low expansion coefficient. The resulting expansion characteristic of this devitrified glass is shown by the curve (a) in FIG. 2. The curve (b) of FIG. 2 shows the expansion characteristic of the transparent glass prior to devitrification. The yield point of this glass decreases more sharply than that of the glass in the embodiments #1 and #2 above. In the glass of the present embodiment, the composition of the $PbO$-$B_2O_3$-$Tl_2O_3$ system and the $Li_2O$-$Al_2O_3$-$SiO_2$ system is 87.7% and 12.3% by weight, respectively.

Embodiment 4.—Devitrified glass having gold as nuclei.

In this embodiment the following composition of materials is employed:

| | Percent |
|---|---|
| Red lead, $Pb_3O_4$ | 46.9 |
| Boric acid, $H_3BO_3$ | 11.2 |
| Thallium oxide, $Tl_2O_3$ | 27.5 |
| Silica powder, $SiO_2$ | 7.1 |
| Aluminum hydroxide, $Al(OH)_3$ | 5.1 |
| Lithium carbonate, $Li_2CO_3$ | 2.15 |
| Gold chloride, $AuCl_3$ | 0.05 |

These materials are mixed well and placed in an alumina crucible. After obtaining a transparent glass by melting the ingredients at approximately 600° C. or above, the glass is again heated to approximately 600° C. from room temperature at a rate of about 2° C./min., and then cooled. This results in the precipitation of fine crystals comprising three components, viz. $Li_2O$, $Al_2O_3$, and $SiO_2$, having a low expansion coefficient. The resulting expansion coefficients and yield points of the transparent glass and devitrified glass are as follows:

| | Expansion coefficient (30–160° C.) | Yield point (° C.) |
|---|---|---|
| Transparent glass | $111.8 \times 10^{-7}$ | 290 |
| Devitrified glass | $92.2 \times 10^{-7}$ | 278 |

As will be seen from this embodiment, the yield point of the glass in accordance with the present invention decreases after devitrification while in the conventional glass it does not. In the above glass the composition of the $PbO$-$B_2O_3$-$Tl_2O_3$ system and the $Li_2O$-$Al_2O_3$-$SiO_2$ system is 87.8% and 12.2% by weight, respectively.

Embodiment 5.—Devitrified glass having zirconium oxide as nuclei.

In this embodiment, the following materials are employed:

| | Percent |
|---|---|
| Red lead, $Pb_3O_4$ | 46 |
| Boric acid, $H_3BO_3$ | 12 |
| Thallium oxide, $Tl_2O_3$ | 27 |
| Silica powder, $SiO_2$ | 7 |
| Aluminum hydroxide, $Al(OH)_3$ | 5 |
| Lithium carbonate, $Li_2CO_3$ | 2 |
| Zirconium nitrate, $ZrO(NO_3)_2 \cdot 2H_2O$ | 1 |

These materials are mixed well and placed in an alumina crucible. After obtaining a transparent glass by melting the ingredients at approximately 600° C. or above, the glass is again heated to approximately 600° C. from room temperature at a rate of about 2° C./min., and then cooled. This results in the precipitation of fine crystals comprising three components, viz. $Li_2O$, $Al_2O_3$ and $SiO_2$ having a low expansion coefficient. The characteristics of the transparent glass and the glass after devitrification are as follows:

| | Expansion coefficient (30–160° C.) | Yield point (° C.) |
|---|---|---|
| Transparent glass | $113.4 \times 10^{-7}$ | 295 |
| Devitrified glass | $102.3 \times 10^{-7}$ | 280 |

It will thus be seen that the yield point is lowered by devitrification. In the glass of this embodiment, the composition of the $PbO$-$B_2O_3$-$Tl_2O_3$ system and the $$Li_2O\text{-}Al_2O_3\text{-}SiO_2$$

system is 87.8% and 12.2% by weight, respectively.

Embodiment 6.—In this embodiment, a low melting point glass component A and a high melting point glass component B having the composition of materials indicated below are well mixed together with $AgNO_3$ in an alumina crucible. Three different mixtures are illustrated wherein the contents of the components A and B are varied and the composition $AgNO_3$ is 2%. After mixing in the alumina crucible, the mixture is melted at approximately 600° C. or above, resulting in a transparent glass. The transparent glass is again heated from room temperature to approximately 600° C. at a rate of about 2° C./min., and cooled to devitrify. The characteristics of the transparent glass and devitrified glass with various compositions are as follows:

Low melting point glass component A:

| | Percent |
|---|---|
| Red lead, $Pb_3O_4$ | 56.8 |
| Boric acid, $H_3BO_3$ | 14.0 |
| Thallium oxide, $Tl_2O_3$ | 29.2 |

High melting point glass component B:

| | |
|---|---|
| Lithium carbonate, $Li_2CO_3$ | 21 |
| Aluminum hydroxide, $Al(OH)_3$ | 44 |
| Silica powder, $SiO_2$ | 35 |

(6–1) In the case of 79% of component A, 19% of component B and 2% of $AgNO_3$, the characteristics are:

| | Expansion coefficient (30–160° C.) | Yield point (° C.) |
|---|---|---|
| Transparent glass | $98.7 \times 10^{-7}$ | 319 |
| Devitrified glass | $56.2 \times 10^{-7}$ | 314 |

(6–2) In the case of 64% of component A, 34% of component B, and 2% of $AgNO_3$, the characteristics are:

| | Expansion coefficient (30–160° C.) | Yield point (° C.) |
|---|---|---|
| Transparent glass | $89.5 \times 10^{-7}$ | 380 |
| Devitrified glass | $43.2 \times 10^{-7}$ | 375 |

(6–3) In the case of 94% of component A, 4% of component B and 2% of AgNO$_3$, the characteristics are:

|  | Expansion coefficient (30–160° C.) | Yield point (° C.) |
|---|---|---|
| Transparent glass | 125.2×10$^{-7}$ | 255 |
| Devitrified glass | 122.3×10$^{-7}$ | 250 |

Although the present invention has been described with reference to specific compositions in the various embodiments, such description is for purposes of clarifying the disclosure only and is not to be interpreted as any limitation on the scope of the invention. Accordingly, it will be appreciated that variations of this invention will be apparent to those skilled in the art and that the present invention is to be limited only by the spirit and scope of the appended claims.

What is claimed is:
1. A low melting point devitrified glass comprising:
  a glass component and a nuclei forming agent,
  said glass component consisting essentially of a low melting point glass of PbO, B$_2$O$_3$, and Tl$_2$O$_3$, in respective weight ratios of about 4:1:2, and a high melting point glass of Al$_2$O$_3$, SiO$_2$ and Li$_2$O, in weight ratios yielding beta-spodumene, beta-eucryptite, lithium metasilicate crystalline phases and mixtures thereof upon thermal devitrification,
  said nuclei forming agent being selected from the group consisting of Au, Ag and ZrO$_2$,
  and the composition of said low melting point glass component, said high melting point glass component and said nuclei forming agent being 55–95%, 3–40% and 0.005–7% by weight, respectively.
2. In the method of manufacturing a low melting point devitrified glass characterized in reducing the yield point thereof and having a glass component and nuclei forming agent, said glass component consisting essentially of a low melting point glass of PbO, B$_2$O$_3$, and Tl$_2$O$_3$, in respective weight ratios of about 4:1:2, and a high melting point glass of Al$_2$O$_3$, SiO$_2$ and Li$_2$O, in weight ratios yielding beta-spodumene, beta-eucryptite, lithium metasilicate crystalline phases and mixtures thereof upon thermal devitrification, and said agent being selected from the group consisting of Au, Ag, and ZrO$_2$, the composition of said low melting point glass component, said high melting point glass component and said nuclei forming agent being 55–95%, 3–4%, and 0.0005–7%, respectively, the steps comprising,
  melting said glass component and said nuclei forming agent to form a glass,
  and heating said glass to precipitate said crystalline phase in said glass.

References Cited
UNITED STATES PATENTS

| 2,898,395 | 8/1959 | Schurecht | 106—54 |
| 3,061,664 | 10/1962 | Kegg | 106—47 |
| 3,211,826 | 10/1965 | Holcomb et al. | 106—49 |
| 3,238,151 | 3/1966 | Kim | 106—49 |
| 3,250,631 | 5/1966 | Lusher | 106—52 |
| 3,291,586 | 12/1966 | Chapman et al. | 106—39 |
| 3,377,522 | 4/1968 | Tsuji et al. | 317—235 |

FOREIGN PATENTS 374,029   6/1962   Japan.

HELEN M. McCARTHY, *Primary Examiner.*

U.S. Cl. X.R.

106—39, 47, 52, 53, 54